(12) United States Patent
Saita et al.

(10) Patent No.: US 6,630,036 B2
(45) Date of Patent: Oct. 7, 2003

(54) FLUX FOR PB-FREE SN-BASED ALLOY SOLDERS

(75) Inventors: Keiko Saita, Tokyo (JP); Masao Watanabe, Tokyo (JP)

(73) Assignee: Advatest Corporation, Tokyo (JP)

( * ) Notice: Subject to any disclaimer, the term of this patent is extended or adjusted under 35 U.S.C. 154(b) by 0 days.

(21) Appl. No.: 09/956,549

(22) Filed: Sep. 19, 2001

(65) Prior Publication Data
US 2002/0033204 A1 Mar. 21, 2002

(30) Foreign Application Priority Data
Sep. 21, 2000 (JP) .................................... 2000-286829

(51) Int. Cl.[7] ............................................. B23K 35/34
(52) U.S. Cl. ........................................................ 148/23
(58) Field of Search .............................. 148/23, 24, 26

(56) References Cited

U.S. PATENT DOCUMENTS

| | | | | |
|---|---|---|---|---|
| 5,223,347 A | * | 6/1993 | Lhymn et al. | ............. 428/614 |
| 5,378,290 A | * | 1/1995 | Tazi et al. | ..................... 148/23 |
| 5,387,669 A | * | 2/1995 | Maeda et al. | ................ 530/216 |
| 5,397,383 A | * | 3/1995 | Wilczek et al. | ............. 106/1.11 |
| 5,907,007 A | * | 5/1999 | Ito et al. | ..................... 524/239 |

* cited by examiner

*Primary Examiner*—Daniel J. Jenkins

(57) ABSTRACT

An object of the present invention is to provide a novel flux, which has sufficient cleaning performance and tolerates to be used under a high flex temperature when used for so-called Pb-free solder, such as Sn—Ag or Sn—Ag—Bi based solder, and which causes no deterioration of material or no disorder in durability and; the soldering flux of the present invention is a soldering flux, in which abietic acid, the main component of rosin, is used as a main base material component, and a solid acid compound, in which a halide ion is not a constituent element, is used as the inorganic component having a function to enhance the flux activity which is added and dispersed in said rosin-based base material.

20 Claims, 7 Drawing Sheets

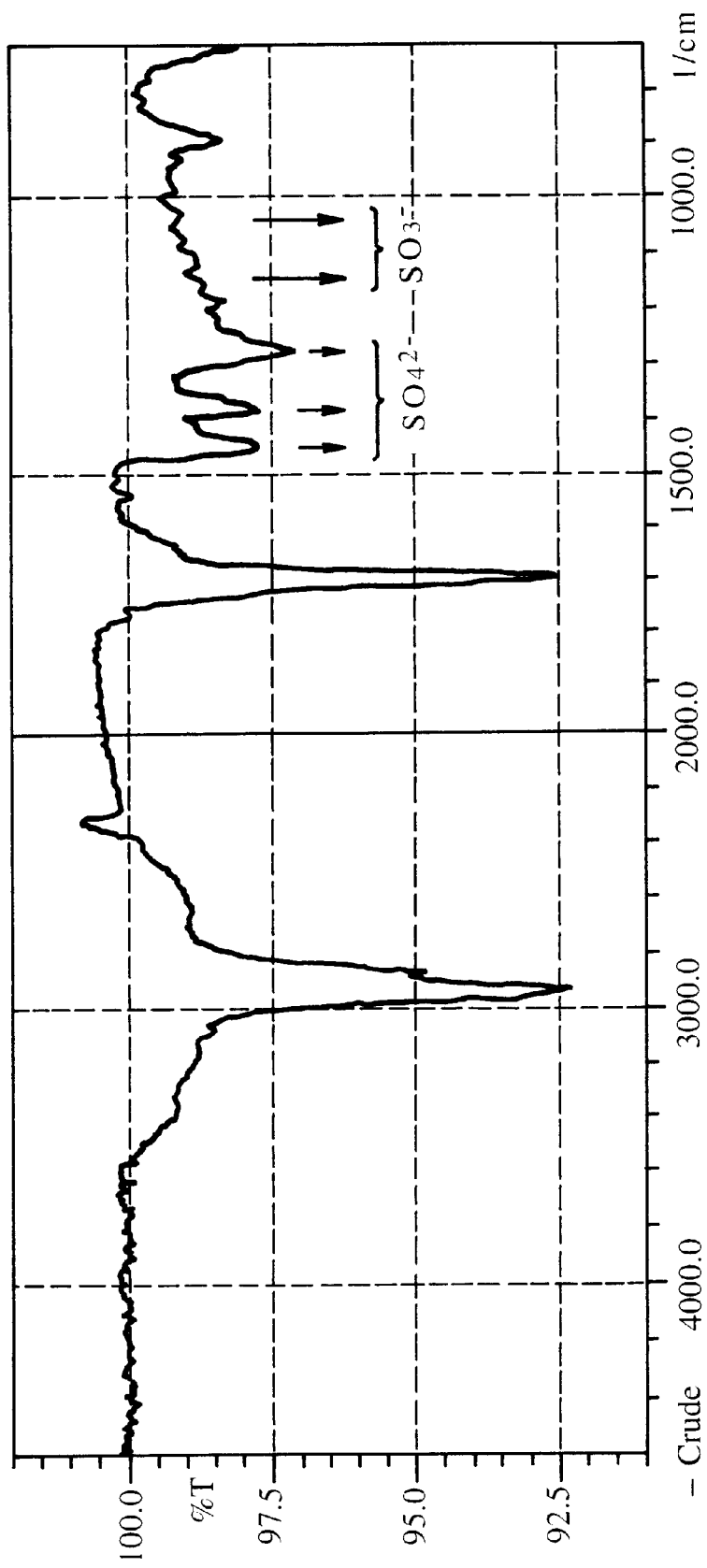
Fig. 1 (A) — Crude

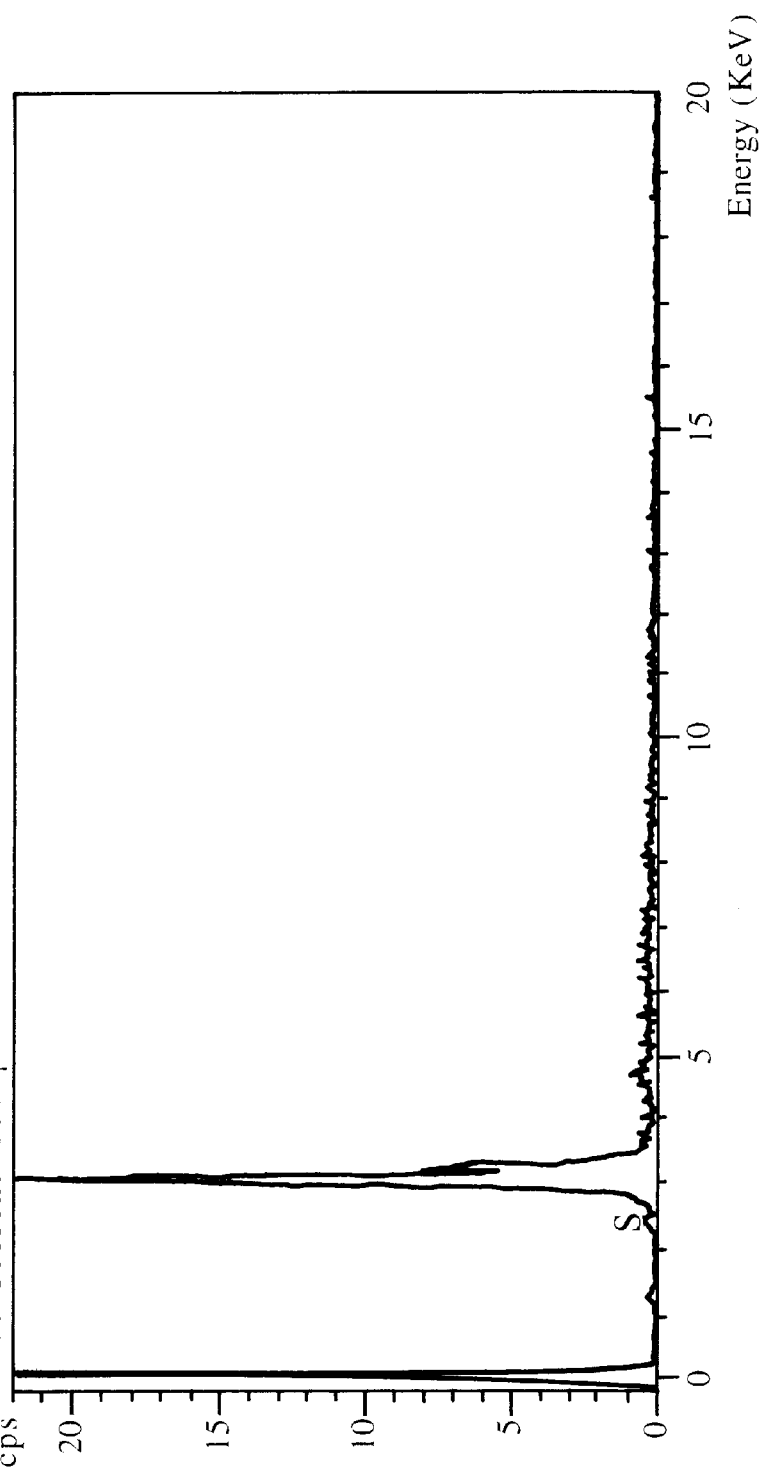

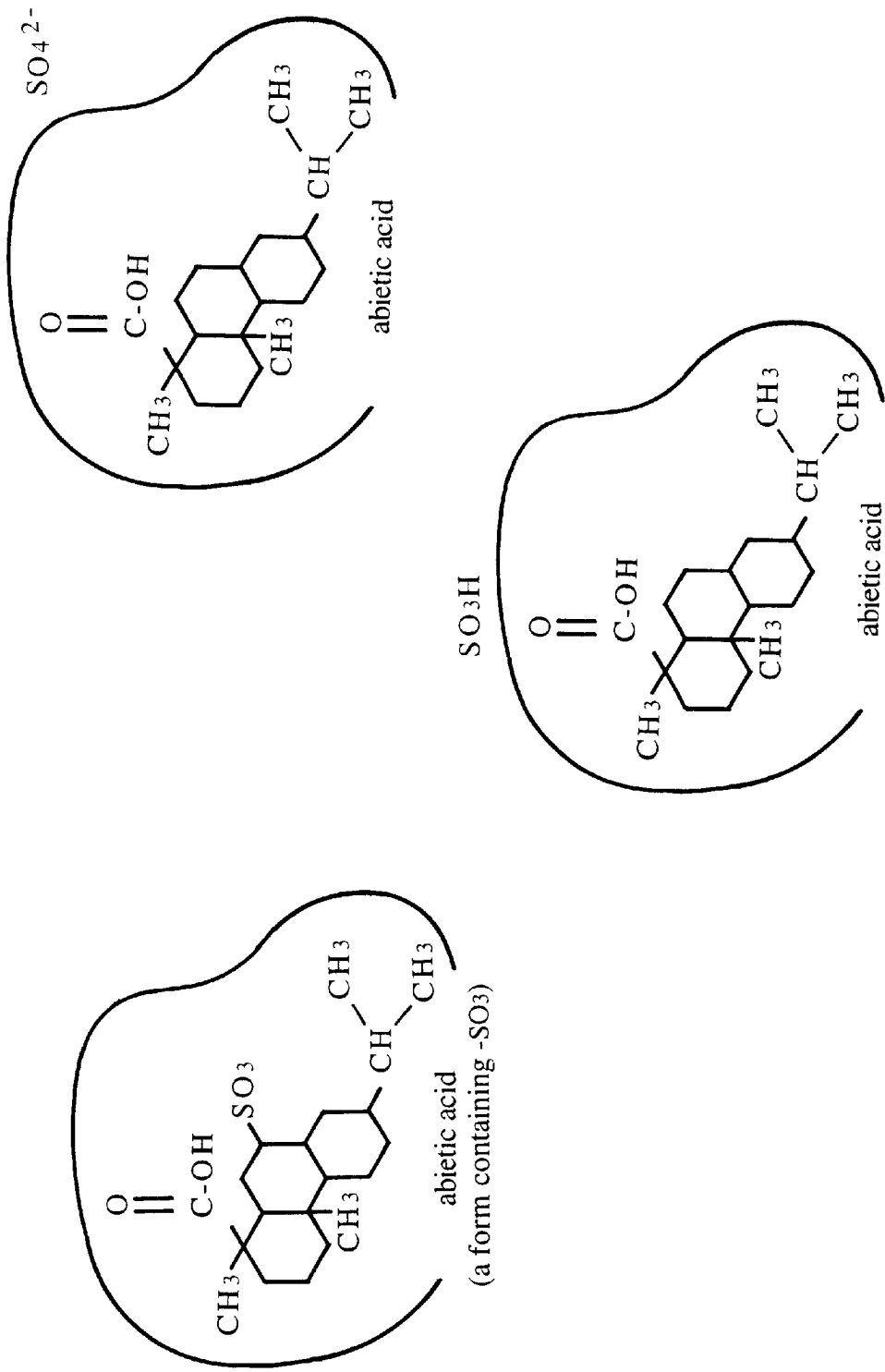

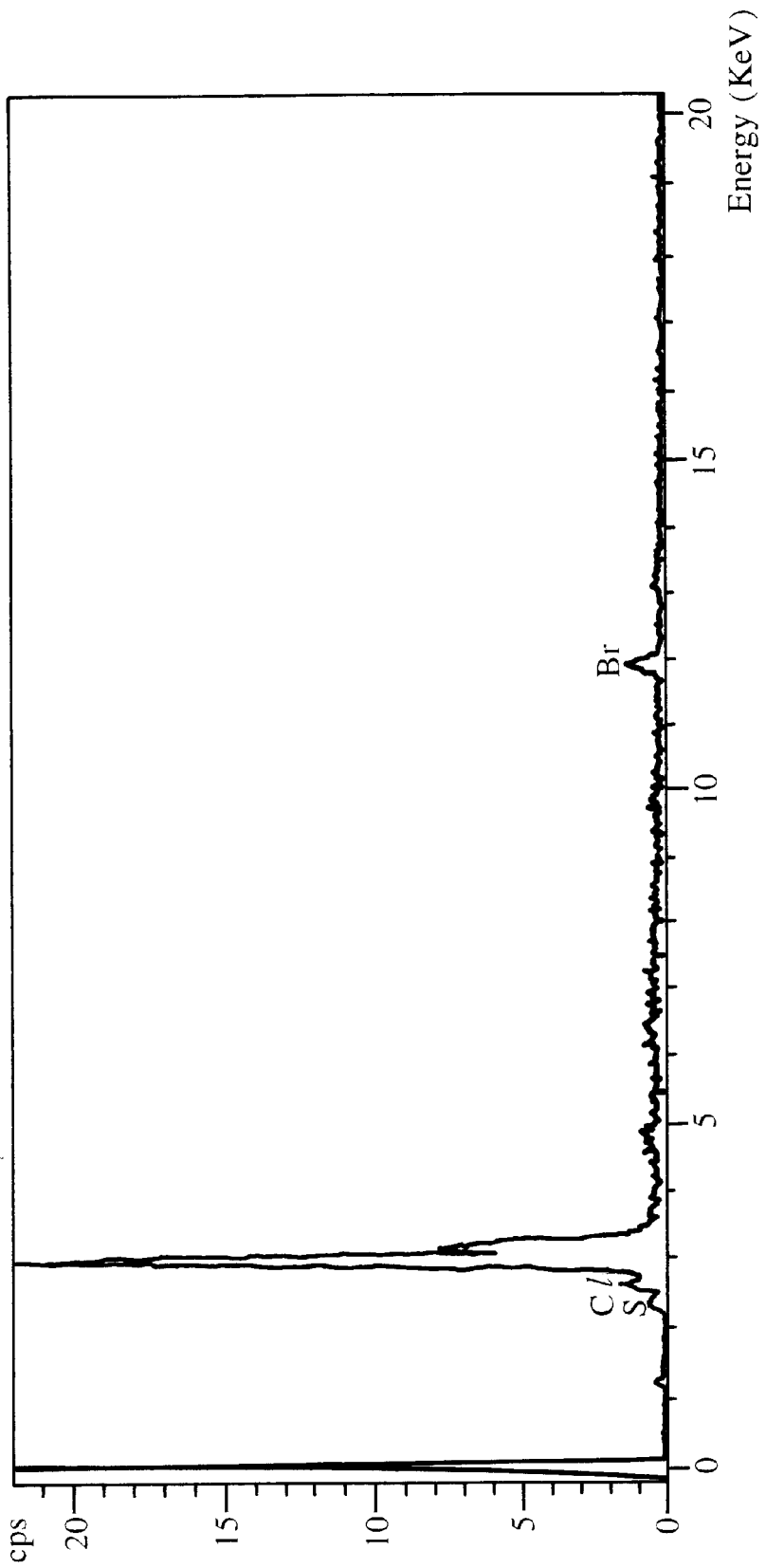

FLUX FOR PB-FREE SN-BASED ALLOY SOLDERS

FIELD OF THE INVENTION

The present invention relates to a flux for Pb-free Sn-based alloy solders. More specifically, it relates to a rosin-based flux used a soldering paste for Sn-based alloy solder containing no Pb, so-called Pb-free solders such as Sn—Ag, Sn—Ag—Bi or Sn—Ag—Cu based alloys, which will be used in the electronics industries fields in replace to a conventional Sn—Pb solder. Further, it relates to a method for preparing said flux for the Pb-free solder. It relates to a soldering flux suitable for so-called Pb-free solder, particularly, for Sn—Ag, Sn—Ag—Bi or Sn—Ag—Cu based solders, which contain Ag as a constitutional component.

BACKGROUND TO THE INVENTION

A soldering step is an essential step for electronic circuit manufacturing. In this step, it is necessary to remove a surface oxidized film of a solder alloy itself or a naturally oxidized film on a surface of a copper foil, to be soldered, on a substrate of a printed circuit to make wetting and affinity of the solder with surfaces of metals to be jointed preferable. For a pretreatment to clean this jointing face, soldering paste or that named flux is used. In soldering, melting of the solder alloy and brazing jointing are simultaneously carried out, and thus the flux treatment is conducted when heating up.

Conventionally, for soldering, the Sn—Pb alloy was used as a solder material. For soldering using this Sn—Pb alloy, since old days, flux, also called soldering paste, such as that prepared by suspending a zinc chloride fine powder in paraffin or that prepared by suspending an ammonium chloride fine powder in rosin was used. As a rule, the inorganic component suspended in this flux (soldering paste) corrodes and breaks the oxide film and on the other hand, an organic component covers the surface of the metal exposed to prevent to contact with air during the step as described above so that it is thought to take a role for preventing repeated formation of the oxide film.

In other words, the oxide film is successfully removed through the following steps. For example, in the flux (soldering paste) prepared by suspending the zinc chloride fine powder in paraffin, the zinc chloride fine powder reacts to tin oxide and the like and paraffin prevents to contact with air. For example, presumed is the following mechanism: zinc chloride reacts to tin oxide to convert to a chloride of tin resulting in an oxide of zinc and thus, corrodes and breaks the oxide film on the Pb—Sn solder alloy.

Meanwhile, in the flux (soldering paste) prepared by suspending an ammonium chloride fine powder in rosin, it may be understood that ammonium chloride is the inorganic component reacting to tin oxide while rosin is the organic component taking a role of preventing to contact with air similarly to paraffin as described above. In the case, for example, ammonium chloride reacts to tin oxide to convert once to tin chloride resulting in dissolution from the surface. Thereafter, a resin acid, abietic acid, and the like, which are main components of rosin, reacts to tin chloride dissolved out as a carboxylic acid to convert it into its carboxylate. On the other hand, a chloride ion species dissociated from tin chloride regenerate ammonium chloride. Such as tin abietate generated is dissolved in rosin molten. As a result, it can be understood that tin oxide is converted into tin abietate to remove the oxide film on the Pb—Sn solder alloy. Also on the surface of copper, it can be interpreted that removal of the oxide film is achieved by a similar reaction.

Consequently, in the flux (soldering paste) prepared by suspending an ammonium chloride fine powder in rosin, ammonium chloride becomes the inorganic component having the action of enhancing the flux activity. The resin acid such as abietic acid contained in rosin is insoluble in water and acid strength thereof is not high. Ammonium chloride, if assumed that it works as ammonia and hydrogen chloride, becomes that showing acid strength. Acidity of rosin itself is yielded from a result of that the resin acid such as abietic acid contained acts as a carboxylic acid which is a proton donor. When ammonium chloride and the like is added, a whole of the flux is realized to enhance the acid strength.

As described above, in the conventional flux, rosin used as the base material has solvent function to disperse fine particles of the inorganic component and in addition, the resin acid, abietic acid, and its relatives, which are main components of rosin, convert the metal oxide of the oxide film into its abietate, and has the solvent function to dissolve the abietate. In addition to this, the resin acid, abietic acid, or its relative has a boiling point as high as 280° C. to be suitable for a third role to insulate from air at a temperature such as that near a reflowing temperature to cause the above described reaction. Rosin itself is softened at about 100° C. and solid at a room temperature, and therefore, preferable for even uniform dispersion of the fine powder of ammonium chloride to keep a state of dispersion.

Conventionally, the Sn—Pb alloy used as the solder material in reflowing may spatter a small amount of lead or lead compound as a fine floating splash. Lead or lead compound such as lead oxide, lead dichloride, lead tetrachloride, and the like are poisonous substances so that even a small amount taken and accumulated by a body for a long time influences badly to health. In the soldering process itself in the electronic circuit manufacture, in order to prevent to expose an operator to the lead or lead compounds, the operation is carried out in a controlled and perfectly designed environment. However, there is an extremely small floating fine powder passed through such control and a problem of disposition of the lead or lead compound removed and collected yet arises. In addition, an electronic circuit shipped as a product is someday disposed and it is anxious that the Sn—Pb alloy left therein, in destruction by fire, generates the lead or lead compound similarly to soldering process to cause environmental pollution.

In order to avoid radically the problem described above, use of the Sn—Pb alloy as the solder material is stopped and in replacement thereto, use of the Sn-based alloy solder free from Pb (so-called Pb-free solder), in particular, such as Sn—Ag, Sn—Ag—Bi or Sn—Ag—Cu based solder is increasing. The solder material is the alloy in which Ag, Bi, Cu or the like is added to Sn, the main component, to lower a melting point thereof. The flux effectively removing oxides thereof is required. Conventionally, it has been known that the flux containing rosin as the base material to be used for the Sn—Pb alloy causes deterioration of material or disorder in durability, when used for the Pb-free solder, such as Sn—Ag or Sn—Ag—Bi based solder.

SUMMARY OF THE INVENTION

The present inventors consider that a flux containing rosin as a base material used for conventional Sn—Pb alloys raises such a problem to cause deterioration of material or defect in durability as described above, when used for Pb-free solder, such as Sn—Ag or Sn—Ag—Bi based solder, and therefore, there is necessity to develop a new flux compatible with Pb-free solder, such as Sn—Ag or Sn—Ag—Bi based solder. In addition, in comparison with conventional Sn—Pb alloys, the Pb-free solder, such as Sn—Ag or Sn—Ag—Bi based solder has a higher flex temperature and hence, a new flux that maintains a high workability even at such a higher reflowing temperature and does not adversely affect a working environment must be developed.

The present invention solves the problem as described above and an object of the present invention is to provide a new flux having sufficient cleaning function, which causes no deterioration of material or no defect in durability when used for Pb-free solder, such as Sn—Ag or Sn—Ag—Bi based solder and tolerates to be used under a high flex temperature. Also, the object includes further providing a new flux that is free from such as a volatile matter adversely affecting working environment.

The inventors, to solve the problem as described above, studied intensively and found as described later that identifying and removing a causal factor of deterioration of material or defect in durability occurring when conventional flux, of which base material is rosin, is used for Pb-free solder, such as Sn—Ag or Sn—Ag—Bi based solder, allow preparing a rosin-based flux, in which occurrence of deterioration of material or defect in durability is prevented even for Pb-free solder, such as Sn—Ag or Sn—Ag—Bi based solder to complete the present invention.

According to the present invention, a flux for Pb-free Sn-based alloy solder of the first invention is a soldering flux, in which a rosin-based flux comprises a rosin-based base material containing abietic acid as a main component, characterized in that the flux contains fine powder of an inorganic component having an action of enhancing a flux activity that is added to and dispersed in the rosin-based base material, and the flux is free from any compound of which a constitutional element is a halide ion.

For example, the flux can be a flux for soldering, characterized in that said fine powder of the inorganic component is fine powder of a solid acid. In addition, it is preferable that the flux is a flux for soldering characterized in that said fine powder of solid acid is a solid acid for which an acid strength has been enhanced or an acid point has been induced by hydrogen reduction. In addition, the flux can be a flux for soldering, characterized in that said fine powder of solid acid is fine powder of a complex that comprises a fine power carrier consisting of an inorganic compound and an inorganic compound other than the inorganic compound used for the fine power carrier, which is supported on the carrier, and the fine powder of said complex, as a whole, exhibits an action as the solid acid.

For example, a more preferable flux for soldering is that in which the fine powder of said complex is fine powder of $Al_2O_3$—NiO or/and $Al_2O_3$—$Cr_2O_3$ in which NiO or $Cr_2O_3$ is supported on a fine powder $Al_2O_3$ as a carrier.

It is more preferable also that the soldering flux according to the first invention is a flux for soldering, in which said rosin-based base material is denatured rosin that is prepared by hydrodesulfurization treatment of crudely purified rosin in the presence of a desulfurization catalyst.

In addition, a flux for the Pb-free Sn based alloy solder according to the second invention of the present invention is the soldering flux, in which a rosin-based flux contains a rosin-based base material containing abietic acid as a main component, characterized in that said rosin-based base material is denatured rosin prepared by hydrodesulfurization treatment of a crudely purified rosin in the presence of a desulfurization catalyst.

Furthermore, in the case where containing the denatured rosin prepared by hydrodesulfurization treatment as the rosin-based base material, it is more preferable that the soldering flux according to the present invention is the soldering flux, wherein said denatured rosin is denatured rosin prepared by hydrodesulfurization treatment and also a treatment for removal by evaporation of an evaporative organic compound impurity contained in the impurity derived from the crudely purified rosin.

The treatment for removal by evaporation of the evaporative organic compound impurity contained in the impurity derived from the crudely purified rosin means treatment to remove the evaporative organic compound impurity evaporating at the melting temperature of the Pb-free solder such as Sn—Ag or Sn—Ag—Bi based solder or lower.

The process for manufacturing a flux for Pb-free Sn based alloy solder according to the present invention is a process for manufacturing a flux, which comprises a rosin-based base material containing abietic acid as a main component and fine powder of an inorganic component having an action of enhancing a flux activity, characterized in that at least comprising a step for preparing denatured rosin by hydrodesulfurization treatment of a crudely purified rosin in the presence of the desulfurization catalyst, wherein said desulfurization catalyst used is a desulfurization catalyst working also as fine powder of an inorganic component having an action of enhancing a flux activity, which is, after said step for hydrodesulfurization treatment, used as the fine powder of the inorganic component having an action of enhancing a flux activity as it is. Therefore, it is a process for manufacturing, characterized in that the step for preparing denatured rosin by hydrodesulfurization treatment of a crudely purified rosin in the presence of the desulfurization catalyst and the step for adding and dispersing fine powder of an inorganic component, which has the action enhancing the flux activity, in denatured rosin are integrally operated as described above by using the fine powder of said inorganic component as the desulfurization catalyst used for said hydrodesulfurization treatment.

BRIEF DESCRIPTION OF THE DRAWINGS

FIG. 1 shows the result of an analysis indicating that sulfur is contained as the impurity in the crudely purified rosin, in which (A) is an example of measurement of an FT-IR spectrum and (B) is an example of measurement of a fluorescent X-ray spectrum.

DETAILED DESCRIPTION OF THE INVENTION

Figure 2B:
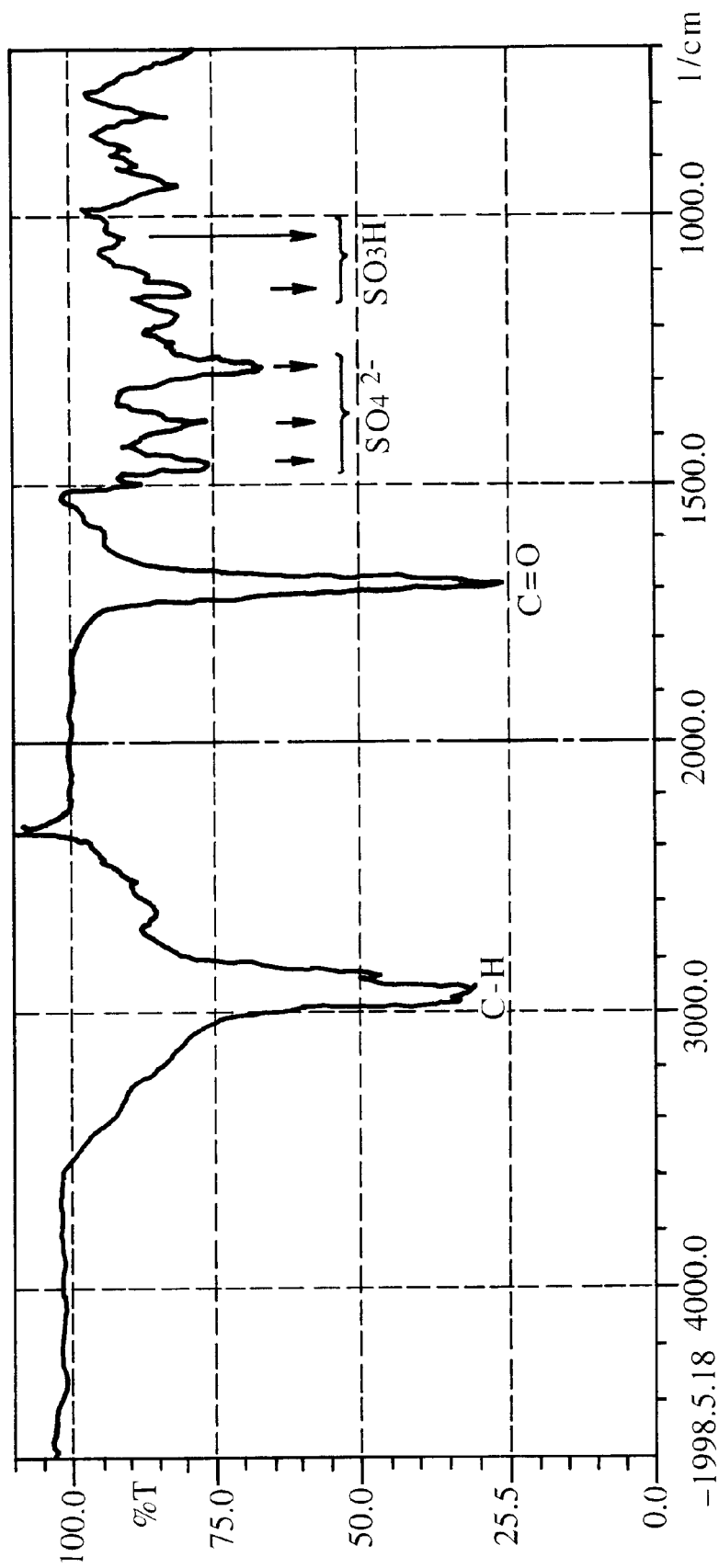
FIG. 2 is a figure illustrating that sulfur impurity exists in forms of $SO_3H$ and $SO_4^{2-}$ in the rosin-based flux for the conventional Sn—Pb alloy solder in which the crudely purified rosin is used as the base material, in which (B) is an example of measurement of an FT-IR spectrum the rosin-based flux for the Sn—Pb alloy solder at a room temperature and (A) is a schematic figure explaining the state of existence of $SO_3H$ and $SO_4^{2-}$ therein.

The flux for Pb-free solder, such as Sn—Ag or Sn—Ag—Bi based solder according to the present invention is that from which the factor is eliminated which is identified as causal one leading to deterioration of material or defect in durability when the rosin-based flux for the conventional Sn—Pb solder is used for the Pb-free solder, such as Sn—Ag or Sn—Ag—Bi based solder on trial. In addition, it is a more preferable activated flux prepared by adding an inorganic component suitable for such a Pb-free solder as Sn—Ag or Sn—Ag—Bi based, which is added to disperse in order to enhance the flux activity.

An improvement accomplished and the action giving the improving effect will be described below in detail for the flux for Pb-free solder, such as Sn—Ag or Sn—Ag—Bi based solder, according to the present invention. In addition, in order to give the improvement, corresponding modifications have been realized for the process for manufacturing the flux for such Pb-free solder as Sn—Ag or Sn—Ag—Bi based solder according to the present invention. The manufacturing process thereof, the method of the steps, and the effect of each step will be described together with.

First of all, a brief description will be given about the causal factor of deterioration of material or defect in durability found by studies of the inventors, when the rosin-based flux for the conventional Sn—Pb solder is used for the Pb-free solder, such as Sn—Ag or Sn—Ag—Bi based solder.

As described above, the conventional rosin-based flux is prepared by using, as the base material, rosin which is a resin residue after removal of such volatile substance as an essential oil in resin oils obtained from a pinaceous plant, and the ammonium chloride fine powder and the like is added and dispersed in rosin as the inorganic component to enhance the flux activity thereof. The activity of flux, that is, removal of the oxide film, is achieved by converting the metal oxide into its abietate with abietic acid to be eluted finally in rosin of liquid state in a heated condition. The inorganic component, for example, ammonium chloride, to be added fills the role of a proton donor intending to enhance the flux activity.

Among these components other than the rosin base material, the component become problematic when used in the flux for the Pb-free solder, such as Sn—Ag or Sn—Ag—Bi based solder was identified. For this purpose, a fluorescent X-ray spectrum of the conventional rosin-based flux was measured to analyze an impurity element contained.

By measurement of the fluorescent X-ray spectrum of the rosin-based flux for the Sn—Pb solder conventionally and practically used, it is concluded that chlorine and bromine are contained as shown in an example of the measurement in FIG. 3(B). In addition, it was found also that sulfur is contained. In addition, by measurement of the fluorescent X-ray spectrum of the crudely purified rosin used as the base material, as shown in the example of the measurement in FIG. 1(B), chlorine or bromine was not observed, but sulfur was found to be contained.

From this comparison, it is known that chlorine and bromine contained in the flux conventionally and practically used are derived from the components for enhancing the flux activity in the conventional rosin-based flux. On the other hand, at the high temperature (temperature for soldering) such as 250° C., as shown diagrammatically in FIG. 3(A), it is supposed that a state like $H^+Cl^-$ or $H^+Br^-$ is formed to work as a proton donor. It can be said that a proton donating ability of these enhances the flux activity.

As described above, the halide ion, in usual an chloride ion ($Cl^-$) and a bromide ion ($Br^-$) are contained in the rosin-based flux for the Sn—Pb solder, and therefore, when it is used for the Pb-free solder, such as Sn—Ag or Sn—Ag—Bi based solder, a silver halide is mostly produced from Ag and the halide ion such as $Cl^-$ and $Br^-$. The inventors found that production of this silver halide is a main cause of deterioration of material or defect in durability.

The rosin-based soldering flux according to the first invention of the present invention is that is adapted to contain no compound which contains a halide ion in the flux as a constitutional element to prevent production of silver halide. In addition, the flux for the Pb-free solder, such as Sn—Ag or Sn—Ag—Bi based solder, according to the first invention of the present invention is prepared by using the rosin-based base material and the fine powder of the inorganic component having the action of enhancing the flux activity is added to this rosin-based base material to prepare the activated flux. Therefore, the rosin-based soldering flux according to the first invention of the present invention is that obtained by adding the fine powder of the inorganic component having the action of enhancing the flux activity and that adapted to contain no compound that contains the halide ion as the constitutional element. In other words, the fine powder of said inorganic component includes nothing containing the halide ion as the constitutional element.

Next, identification is carried out for the component becoming problematic among impurity components derived from the base material rosin, when the conventional practical flux is used for the Pb-free solder, such as Sn—Ag or Sn—Ag—Bi based solder. As described above, the crudely purified rosin used for the base material contains sulfur. In order to identify the sulfur component contained in the crudely purified rosin, a FT-IR spectrum of the crudely purified rosin was measured. It can be known that from the example of the FT-IR spectrum, for example, as shown in FIG. 1(A), measured for a sample prepared by dissolving the crudely purified rosin in ethanol, an absorbance, which is not found in an molecule of abietic acid inherently and attributed to vibrational modes derived from $SO_4^{2-}$ and $SO_3^-$, was observed. From the result, it was known that the crudely purified rosin contains a sulfur content as an impurity and a considerable amount of at least $SO_4^{2-}$ and $SO_3^-$ as much as detectable in the FT-IR spectrum.

For the conventional practical flux, the FT-IR spectrum was measured at a room temperature. For example, as shown in the measurement example of FIG. 2(B), the vibrational modes derived from $SO_4^{2-}$ and also the vibrational modes derived from $SO_3H$ were observed.

On the basis of this result, the state of residual impurity sulfur contained in the crudely purified rosin itself as the raw material was analyzed for the conventional rosin-based flux. As the result of the analysis, as shown diagrammatically in the FIG. 2(A), it was predicted that the impurity sulfur at a room temperature exists partially as a sulfonyl in the molecule of abietic acid in addition to free $SO_4^{2-}$ and $SO_3H$. In other words, a considerable part of the sulfur content can be bound to a skeleton of abietic acid, for example, in an organic molecule as the sulfonyl (—$SO_2$—). In addition, a sulfo group (—$SO_3H$) and a sulfo-oxyl group (—$SO_4H$) can exist.

Figure 3A:
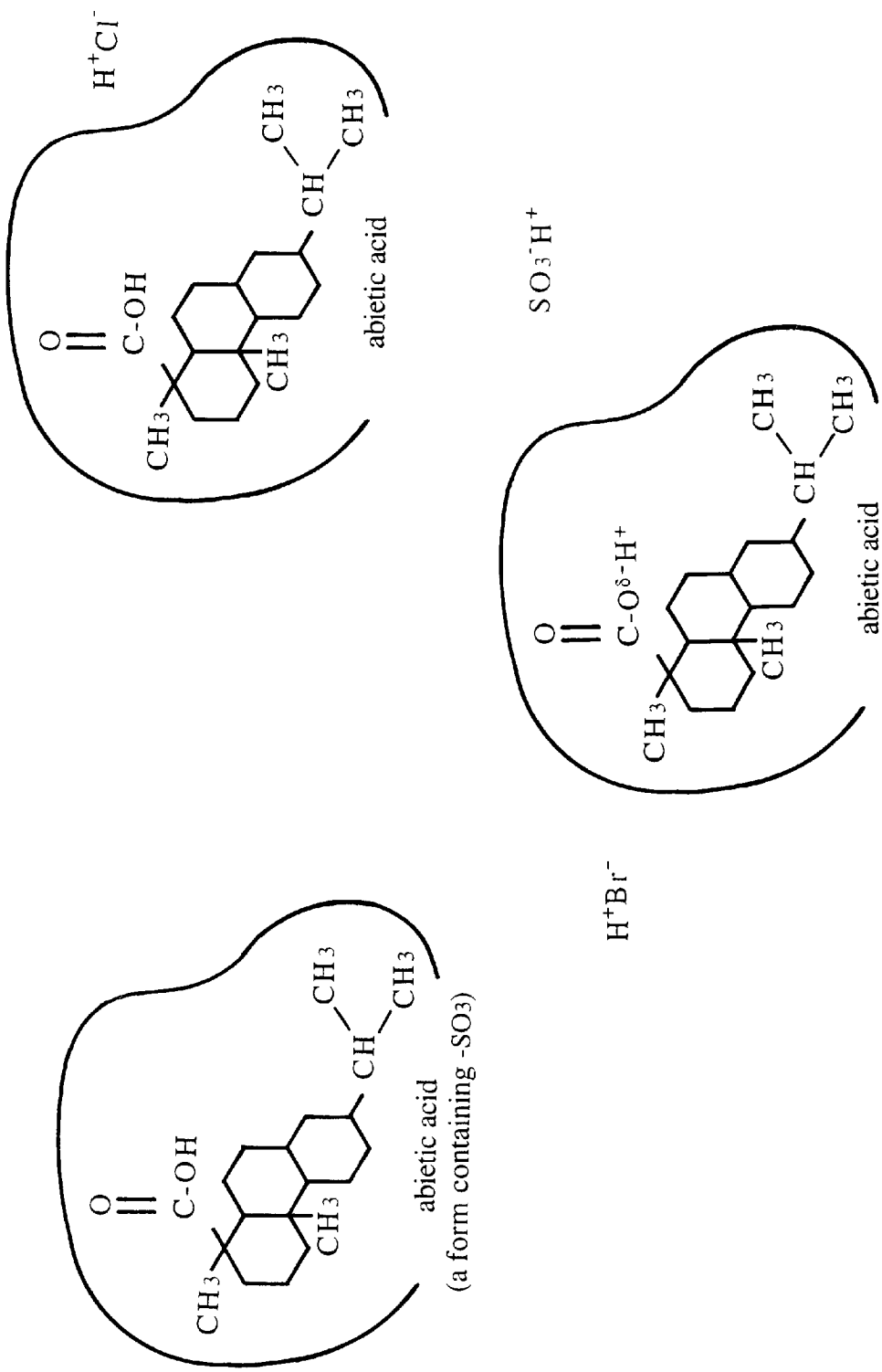
FIG. 3 is a figure showing that chlorine and bromine exists in addition to sulfur in the rosin flux for the conventional Sn—Pb alloy solder, in which (B) is an example of measurement of the fluorescent X-ray spectrum of the rosin flux for the Sn—Pb alloy solder and (A) is a schematic figure explaining the state of existence of chlorine and bromine at the high temperature (temperature applied: 250° C.)

On the other hand, at the high temperature (temperature for soldering) such as 250° C., as shown diagrammatically in FIG. 3(A), it is supposed that free $SO_3^-H^+$ and the like as well as $H^+Cl^-$ or $H^+Br^-$ work as the proton donor. In the conventional activated flux, $H^+Cl^-$ or $H^+Br^-$ derived from ammonium chloride enhances the flux activity; however, considerable part of the impurity sulfur content contained in the crudely purified rosin itself is $SO_3^-H^+$ having the proton donating ability. Also it was known that the flux activity is partially enhanced by this contribution.

As described above, in the rosin-based flux for the conventional Sn—Pb solder, the impurity sulfur contained in the crudely purified rosin itself contributes to enhancement of the flux activity as such as $SO_3^-H^+$ having the proton donating ability. However, it was found that in using as the flux for the Pb-free solder, such as Sn—Ag or Sn—Ag—Bi based solder, the impurity sulfur, when reduced, becomes $S^{2-}$ and may produce silver sulfide with silver to cause deterioration of material or defect in durability.

The rosin-based flux according to the second invention of the present invention is that prepared by using the denatured rosin that has been treated for removal of the impurity sulfur as the rosin base material for use to prevent this production of silver sulfide. In other words, the flux for the Pb-free solder, such as Sn—Ag or Sn—Ag—Bi based solder, according to the second invention of the present invention is the rosin-based flux containing the rosin-based base material in which abietic acid is contained as the main component, wherein said rosin-based base material is the denatured rosin prepared by hydrodesulfurization treatment of the crudely purified rosin in the presence of the desulfurization catalyst.

First of all, for achieving the above described effect, a preferable constitution of the flux for the Pb-free solder, such as Sn—Ag or Sn—Ag—Bi based solder, according to the first invention of the present invention will be more specifically described below.

The flux for the solder according to the first invention is prepared as the activated flux by adding the fine powder of the inorganic component having the action of enhancing the flux activity. On the other hand, a compound containing the halide ion as the constitutional element must be not contained and thus, the fine powder of said inorganic component is that better to be selected from compounds not containing the halide ion as the constitutional element and having the action to enhance removal of such as the oxide film existing on the surface of the solder alloy by any mechanisms. For reference, the amount of the fine powder of the inorganic component contained is, according to mechanisms and strength of the action of enhancing the flux activity, properly chosen to raise the flux activity of the rosin base material to a range desired.

For instance, as the fine powder of the inorganic component having the action of enhancing the flux activity, it is preferable to select those having the action to enhance the acid strength. Among them, it is preferable to choose various solid inorganic components called the solid acid of which surface shows acidic. The solid inorganic compound working as the solid acid are exemplified by a metal oxide ($Al_2O_3$, $V_2O_3$, and the like,) a sulfide (ZnS and the like,) a sulfate ($NiSO_4$, $CuSO_4$, and the like,) phosphate ($AlPO_4$, phosphates of Ti, and the like) and a chloride ($AlCl_3$, $CuCl_2$, and the like.) In addition, clay minerals (acid clay, montmorillonite, and the like,) zeolite, and the like showing various catalytic activity are also a kind of solid acid. Also, those, which are the fine powder of the complex comprising a fine powder carrier and other kind of the inorganic compound than the inorganic compound used for said carrier that is supported on the carrier and show the action as the solid acid, are the kind of solid acid as a whole of the fine powder of said complex.

In adding to the flux, a magnitude of the action to enhance the flux activity depends, of course, on the strength of the acid center (acid active center) on the surface of these solid acids. Therefore, it is preferable that the solid acid to be added is made in a fine powder form and high in a sum of a surface area per a unit weight. It is more preferable that the flux contains the fine powder of the solid acid of which strength of surface acid center (acid active center) is increased or the acid center (acid active center) is expressed by carrying out some treatment of the surface. For instance, as such activating treatment, it is further preferable to use the fine powder of the solid acid of which strength of acid center (acid active center) on the surface has been increased and the acid center (acid active center) has been expressed by heating in a hydrogen atmosphere and keeping under the hydrogen reduction condition. In other words, it is further preferable to use a gas for the activating treatment and remove readily the gas used after the treatment. Therefore, the solid acid, of which strength of acid center (acid active center) on the surface has been increased or the acid center (acid active center) has been expressed by the hydrogen reduction as described above, is more preferable.

In addition, in soldering with the Pb-free solder, such as Sn—Ag or Sn—Ag—Bi based solder, it may frequently occur that, for example, a free $SO_4^{2-}$ and a $SO_3H$, or sulfur in an oxidized condition, bound to the skeleton of abietic acid as the sulfonyl ($—SO_2—$) is changed to a sulfide ion by reduction. In such a very high, reductive atmosphere, for example, it is expected that the reaction similar to that in the atmosphere of hydrogen reduction occurs. For example, in the solid acid, of which strength of acid center (acid active center) on the surface can be increased or the acid center (acid active center) can be expressed by the hydrogen reduction, in soldering, when it is put in the strong reductive atmosphere where sulfur in the oxidized condition is reduced to change the sulfide ion, it is expected aloso that an increase, similar to the case of the hydrogen reduction, in strength of the acid center (acid active center) or an expression of the acid center (acid active center) occurs.

In the flux according to the first invention of the present invention, the metal oxide among various solid acids as described above are more preferable because a desired fine powder can be easily available and as a rule, strength of the acid center (acid active center) is enhanced by hydrogen reduction. In using metal oxide to become the solid acid, one kind of metal oxide may be used or two kinds or more of metal oxides may be used in combination.

In addition, a fine powder of the complex comprising a fine powder of an inorganic carrier and a metal oxide supported on the carrier that works as the solid acid can be used. In addition, those, in which the inorganic carrier itself is the metal oxide working as the solid acid and the fine powder of the complex made by supporting other metal oxide thereon works as the fine powder of the solid acid, can be used. On the other hand, those, which is the fine powder prepared by supporting further other metal oxide and the like on the fine powder of the complex and works as the fine powder of the solid acid, can be used.

Specifically, in the flux according to the present invention, as the fine powder of the inorganic component having the action of enhancing the flux activity, the metal oxide working as the solid acid is, for example, exemplified by $Al_2O_3$, $V_2O_3$, $SiO_2$—$Al_2O_3$, and the like. In addition, those that are prepared by supporting the metal oxide on the fine powder of the inorganic carrier and work as the solid acid as a whole are, for example, exemplified by $Al_2O_3$—NiO, $Al_2O_3$—$Cr_2O_3$, $Al_2O_3$—CdO, and the like using the fine powder $Al_2O_3$ as the inorganic carrier.

It has been that nickel oxide (II); NiO may become a black oxide of about $NiO_{1.2}$. In such a case, if put under the condition of hydrogen reduction to eliminate excessive oxygen, it can be converted into NiO. On the other hand, solid NiO is reduced to nickel in a hydrogen gas stream at a relatively low temperature. Chromium oxide (III), $Cr_2O_3$ is used as a chromium oxide catalyst and shows a catalytic activity to, for example, hydrogenation and dehydrogenation reactions by itself or in combination with other oxide. In these metal oxides, for example, it can be expected that if it is put under the condition of hydrogen reduction, constituent oxygen is expected to be partially converted from O to OH resulting in increase in the acid strength.

Preferably, in the flux for the solder according to the present invention, as the inorganic component enhancing the flux activity derived from abietic acid contained as the main component in the rosin-based base material, the solid acid is added. For amount of the inorganic component added to enhance the flux activity, for example, it is preferable that such the fine powder of the solid acid as $Al_2O_3$—NiO, $Al_2O_3$—$Cr_2O_3$, which are the solid acids preferable as the inorganic component added to enhance the flux activity, of 0.1 to 4.0 weight parts, preferably 0.1 to 1.0 weight parts is added to 100 weight parts of the denatured rosin. This fine powder of the solid acid is that uniformly dispersed in the rosin-based base material and hence, preferably is a fine particle with an average radius ranging from 0.01 to 1.0 μm and more preferably, from 0.01 to 0.1 μm.

When the fine powder of the solid acid used as the inorganic component to enhance the flux activity is used as the carrier for such as Co—Mo catalyst (desulfurization catalyst) utilized in hydrodesulfurization treatment of the crudely purified rosin described later, it is preferable that a metal catalyst such as the Co—Mo catalyst (desulfurization catalyst) is chosen in the range from 0.1 to 2.0 weight parts and preferably from 0.1 to 1.0 weight parts to be added to 100 weight parts of the fine powder of the solid acid for the carrier. Selection of the range as described above is more preferable because the Co—Mo catalyst (desulfurization catalyst) itself, which is added to achieve a desired desulfurizing catalytic activity and is prepared with the carrier of the fine powder of the solid acid, becomes the added amount objective of the fine powder of the solid acid in the flux. For said fine powder of the solid acid, the complex such as $Al_2O_3$—NiO and $Al_2O_3$—$Cr_2O_3$ made of alumina ($Al_2O_3$) with other metal oxide (i.e. NiO and $Cr_2O_3$) is preferable. In this case, preferably used one (mixture) is that in which the average composition thereof a proportion of alumina ($Al_2O_3$) to other metal oxide (i.e. NiO and $Cr_2O_3$) is the other metal oxide (i.e. NiO and $Cr_2O_3$) ranging from 0.8 to 1.2 mol and preferably from 0.9 to 1.1 mol for alumina ($Al_2O_3$) of 1 mol.

It is preferable that in the soldering flux according to the first invention of the present invention, a total acid strength is absent or sufficiently low at a room temperature. In this point, it is more preferable that using the solid acid described above yields the acid strength is not expressed at a room temperature and a desired acid strength at a high temperature only.

In the flux according to the present invention, a form of the flux at a room temperature can be made like a paste. In this case, the fine powder of the solid acid described above and the like are uniformly dispersed in the rosin-based base material. On the other hand, rosin itself is softened by heating, melted at the temperature in the range from 90 to 100° C., and becomes a solid state at a room temperature. Therefore, the flux according to the present invention can be made the form of a paste-like mixture and dispersoid in which fine particle rosin as well as the fine powder of the inorganic component is dispersed.

The rosin-based base material used for the flux according to the present invention is that in which the resin acid contained in rosin is used as the flux activating component. The crudely purified rosin commercially available is a resin residue remained after removal of volatile substances such as the essential oil from the resin oils yielded from the pinaceous plant and includes a plurality of the resin oils having a higher boiling point. In this crudely purified rosin, the composition thereof varies somewhat according to the species of Pinus; the main component thereof is the resin oil containing about 90% and a 10% of a neutral component is also included. The main component of the resin oils are abietic acid and relatives thereof and said relatives are, for example, mainly exemplified by dihydroabietic acid, dehydroabietic acid, abietic anhydride, and the like. The neutral component includes an esterified one (—COO—R) and also that in which a carboxy group (—COOH) has been replaced to formyl group (—CHO) and methylol group (—$CH_2OH$). Concerning these resin oil components, one prepared by distillation to convert into rosin oil (boiling point: 280° C. or higher) is available. The flux according to the present invention uses abietic acid and its relatives existing together with mainly as the flux-activating component. For example, abietic acid itself shows the melting point ranging from 172° C. to 175° C. and becomes a liquid at the temperature in soldering, but uneasily evaporated.

Consequently, in the rosin-based base material used for the flux according to the present invention, it is preferable that rosin is used after purification treatment such as preceding removal of the neutral component and impurity components other than abietic acid and its relative resin acids such as dihydroabietic acid, dehydroabietic acid, and abietic anhydride.

In the soldering flux according to the first invention of the present invention, the inorganic component is contained to enhance the flux activity and thus, enhancement of the flux activity by the sulfur component, such as $SO_3^-H^+$ having the proton donating ability, contained in the crudely purified rosin may not be necessary. Therefore, the rosin-based base material used is preferably one using the denatured rosin treated for preceding removal of the sulfur impurity. In other words, it is more preferable that the rosin-based base material is the denatured rosin prepared by hydrodesulfurization treatment of the crudely purified rosin in the presence of the desulfurization catalyst.

In the Pb-free solder, such as Sn—Ag or Sn—Ag—Bi based solder, the melting point is high and therefore, evaporation of a volatile organic compound (VOC molecule), which is not problematic in using the conventional Sn—Pb solder, contained in the crudely purified rosin as the impurity becomes a considerable magnitude. The volatile component has been removed from the crudely purified rosin; however, an evaporative component having the boiling point somewhat lower than that of rosin oil (boiling point: 280° C. or higher) has left and these components having a relatively low boiling point are preferable to be removed precedently. These components having a relatively low boiling point do not affect soldering performance, however, when diffused to an environmental atmosphere, those may cause air pollution and also originate global environmental pollution and green house effect gas.

Among organic compounds as secondary components contained in the crudely purified rosin, the volatile organic compound easily evaporated at the soldering temperature does never contribute to the flux activity. The rosin-based base material has an important role as a covering liquid film to prevent reoxidization, and for this role, the volatile organic compound described above is not necessary. Thus, it is more preferable to use the denatured rosin from which the volatile organic compound impurity, which may be evaporated at the soldering temperature resulting in pollution of the working environment, has been removed.

Removal of the volatile organic compound impurities can be carried out in conventional manner by dissolving or melting the crudely purified rosin and by applying such a method as distillation. In hydrodesulfurization treatment of the crudely purified rosin in the presence of the desulfurization catalyst, removal of the volatile organic compound impurities can be carried out in combination. As the result, it is preferable to make the denatured rosin not containing the volatile organic compound of the boiling point of 200° C. or lower under the standard atmospheric pressure. In other words, it is preferable that a sum of the volatile organic compound of the boiling point of 200° C. or lower under left in the denatured rosin is 200 ppm (ppm by weight) or less to the denatured rosin, and more preferably 100 ppm (ppm by weight) or less. In addition, it is preferable for the volatile organic compound of a relatively high boiling point ranging between 250° C. and higher soldering temperature (for example, 220° C.) that the sum is set to 50 ppm (ppm by weight) as a highest limit, or less.

Subsequently, to achieve such effect as described above, a preferable constitution of the flux for the Pb-free solider, such as Sn—Ag or Sn—Ag—Bi based solder, according to the second invention of the present invention will be specifically described below.

The rosin-based flux according to the second invention of the present invention is that in order to prevent reduction of the sulfur impurities contained in the crude purified rosin to produce finally silver sulfide, the rosin-based flux used is prepared by using the denatured rosin precedently treated to eliminate the sulfur impurities. In other words, the flux for the Pb-free solder, such as Sn—Ag or Sn—Ag—Bi based solder, according to the second invention of the present invention is the soldering flux characterized in that in the rosin-based flux comprising the rosin-based base materials which contains abietic acid as the main component, said rosin-based base materials is the denatured rosin subjected to hydrodesulfurization treatment of the crudely purified rosin in the presence of the desulfurization catalyst.

First of all, for removal of sulfur component contained as impurity in the crudely purified rosin, a method of hydrogenating desulfurization which is the well known method in an oil refining field. As the method for removing sulfur compounds contained in petroleum, there is a chemical treatment method using sulfuric acid and an alkali; however, in the present invention, applying such chemical treatment method results in that abietic acid and the like, different from a petroleum product such as kerosine, have the high boiling point and hence, a reagent used is difficult to be separated by distillation. In this view, the method of hydrogenating desulfurization using the solid catalyst is selected as that more suitable. After finishing hydrogenating desulfurization treatment, it provides an advantage that abietic acid and the like becomes a liquid state by heating to 200° C. or higher, thus simple means such as heating filtration can be applied to removal of the solid catalyst. Thus, hydrogenating desulfurization treatment is carried out for a purpose to remove not only a free-type sulfur-containing molecular species, but also sulfur contained as a form of sulfonyl and the like in a molecule by reduction. In contrast, when the free-type sulfur-containing molecular species such as $SO_4^{2-}$ and $SO_3^-$ are only contained, for example, dissolving in a solvent such as alcohol allows separating and removing.

Hydrogenating desulfurization treatment is preferably carried out under the temperature enough lower than the boiling point of abietic acid and the like being the main component of rosin and hence, it is preferable that by using the cobalt-molybdenum catalysts (Co—Mo catalyst) as the desulfurization catalyst supported by alumina, the hydrogenating desulfurization treatment is carried out under a pressurizing condition of about 5 or lower atmospheric pressure and heating at the temperature lower than 280° C. When such a hydrogen pressure and temperature range as described above are selected, an unnecessary side reaction such as hydrogen reducing reaction to abietic acid itself being the main component of rosin does not occur, and therefore the objective hydrogenating desulfurization treatment is only selectively carried out.

For example, the solid impurity contained in the crudely purified rosin is precedently removed, such alcohol as isopropyl alcohol is added to fluidize, the fine particles of the desulfurization catalyst prepared by supporting thinly the Co—Mo catalyst on fine powder alumina carrier is added to the fluidized rosin in the range from 0.1 to 2.0% and mixed evenly. For the hydrogenating desulfurization treatment, the following method is proper: in a pressurizable reaction container, under a heating temperature of about 250° C. and slightly pressurized condition (for example, pressurizing pressure: 1 to 3 atmospheric pressure), the hydrogen gas is circulated to blow in a liquid containing rosin.

In the soldering flux according to the second invention of the present invention, it is preferable the sulfur component left in the denatured rosin subjected to the hydrodesulfurization treatment to use preferably as the rosin-based base materials is 30 ppm (ppm by weight) or less suitably, and more preferably 10 ppm (ppm by weight) or less.

In addition, for the soldering flux according to the second invention of the present invention, it is more preferable using the denatured rosin subjected to removal of not only sulfur but also the volatile organic compound. This removal of the volatile organic compound impurities can be carried out in course of the hydrodesulfurization treatment. As the result, it is preferable that the denatured rosin is that not containing the volatile organic compound of the boiling point of 200° C. or lower under the standard atmospheric pressure. In other words, it is preferable that the sum of the volatile organic compound of the boiling point of 200° C. or lower under left in the denatured rosin is 200 ppm (ppm by weight) or less to the denatured rosin, and more preferably 100 ppm (ppm by weight) or less. In addition, it is preferable for the volatile organic compound of the boiling point ranging between 250° C. and higher soldering temperature (for example, 220° C.) that the sum is set to 50 ppm (ppm by weight,) as a highest limit, or less.

In addition, for the soldering flux according to the second invention of the present invention, the denatured rosin, subjected to the hydrodesulfurization treatment, is used as the rosin-based base materials and thus, $SO_3^-H^+$ and the like, having the proton donating ability and contained inherently in the crudely purified rosin, has been removed. Therefore, enhancing activity of the flux activity by $SO_3^-H^+$ and the like, having the proton donating ability, is not left and hence, for preparation of the activated flux, it is suitable to add separately the inorganic component having activity enhancing the flux activity. As the inorganic component having activity enhancing the flux activity, one described as preferable for the soldering flux according to the first invention is preferably used in the second. In addition, it is preferable the amount of addition for the second invention is selected also from the range preferable for the soldering flux according to the first invention as described above.

On the other hand, in order to carry out removal of the sulfur component contained in the crudely purified rosin by the hydrodesulfurization treatment up to the range of concentration as described above, such as $MoS_2$ catalyst other than the Co—Mo catalysts can be used also as the hydrodesulfurization catalyst. In addition, the hydrodesulfurization catalyst such as the Co—Mo catalyst used is preferably that prepared by supporting the metal catalyst on the carrier. The carrier usable is exemplified by alumina itself and a metal oxide complex such as $Al_2O_3$—NiO and $Al_2O_3$—$Cr_2O_3$ having alumina as the base material, which the carrier itself is hard to be damaged in the presence of sulfur component. For reference, NiO and $Cr_2O_3$ contained in $Al_2O_3$—NiO and $Al_2O_3$—$Cr_2O_3$ are insoluble in alcohol and therefore, for example, in blending with the crudely purified rosin, an alcohol solvent can be used.

For example, for the Co—Mo catalyst supported on alumina, selection of the amount of, the Co—Mo catalyst supported for 100 weight parts of the carrier alumina particle is preferably from the range of 0.1 to 1.0 weight parts in total, and more preferably from the range of 0.1 to 0.2 weight parts. On the other hand, for the average particle size of the carrier alumina particle itself, preferable fine particle ranges from 0.1 to 10 μm, and preferably from 0.1 to 1.0 μm. The hydrogen reducing reaction is carried out under the heating temperature of about 250° C. and slightly pressurized condition (for example, pressurizing pressure: 1 to 3 atmospheric pressure), the hydrodesulfurization catalyst such as the Co—Mo catalyst, which is supported on the carrier, is added ranging preferably from 0.1 to 1.0 weight parts, and more preferably ranging from 0.1 to 0.2 weight parts per 100 weight parts of the crudely purified rosin. The treatment is carried out by selecting the amount of the hydrodesulfurization catalyst to be added from the range as described above, the reaction temperature of the hydrogen reducing condition from the range of 120 to 300° C., preferably 150 to 250° C., and more preferably 150 to 200° C., in other words about 250° C., and a partial pressure of hydrogen, which is supplied to the reaction container, from the range of 1.2 to 5.0 atmospheric pressure (for reference, 1 atmospheric pressure is $1.01325 \times 10^5$ Pa), preferably 1.5 to 3.0 atmospheric pressure, more preferably about 2.0 atmospheric pressure.

A reaction time is properly selected according to a content of the sulfur component contained in the crudely purified rosin. For a normal quality, under the reaction condition as described above, the treatment carried out for 20 to 100 minutes and preferably from 20 to 30 minutes allows reducing the sulfur component left up to a preferable range of 10 ppm or lower.

For reference, prior to carrying out the hydrodesulfurization treatment, preceding removal of the solid impurity, which can affect the reaction, left in the crudely purified rosin is preferable. For example, it is possible to dissolve the crudely purified rosin once to make it liquid state and remove the solid impurity by solid-liquid separation. If the crudely purified rosin is a powder and the solid impurity can be removed filtering, a filter of a predetermined mesh size can be used for removing it. Thereafter, in order to blend uniformly with the fine particles of the hydrodesulfurization catalyst as described above, the powder of the crudely purified rosin is fluidized by adding as a diluting solvent an organic solvent such as alcohol capable of dissolving rosin. By this fluidization, a liquid impurity, a low boiling point impurity, and the impurity easily soluble in a diluting solvent, which are contained in rosin, are all dissolved rapidly in the diluting solvent such as alcohol used.

In this fluidization treatment, as the diluting solvent for use, the organic solvent, capable of dissolving rosin, such as alcohols having 1 to 4 carbons can be used preferably. Particularly, isopropyl alcohol, which is used for cleaning of a semiconductor substrate in soldering works, is more preferably used. For the fluidization treatment, such as 50 weight parts or more, preferably 50 to 80 weight parts, more preferably 50 to 60 weight parts of isopropyl alcohol as the diluting solvent can be preferably used for 100 weight parts of the crudely purified rosin. The crudely purified rosin is preferably supplied to the hydrodesulfurization treatment after such pretreatment is carried out.

The sulfur component reduced by this hydrodesulfurization treatment appears in a gas phase as hydrogen sulfide ($H_2S$). In addition, this reaction is carried out under a heated condition and therefore, the volatile organic compound impurities having the relatively low boiling point and left in the crudely purified rosin are simultaneously evaporated. At this time, hydrogen sulfide and the volatile organic compound impurities contaminating a circulating hydrogen gas is taken out from the reaction container by circulation to separate and collect each. Therefore, hydrogen sulfide and the volatile organic compound impurities are never diffused to the environmental atmosphere to be able to prevent environmental pollution. In addition, for example, when the sulfur component exists in the form of thiophene ($C_4H_4S$), the hydrodesulfurization treatment produces additionally hydrocarbon compound such as butane ($C_4H_{10}$). These volatile organic compounds as byproducts are separated and collected.

Some of the resin acids-being the main component of rosin are denatured by reduction in the hydrogenating reduction step as described above, and these are carboxylic acids having the high boiling point to be left in the denatured rosin; there is no problem.

The process for preparing the flux for the Pb-free solder, such as Sn—Ag or Sn—Ag—Bi based solder, according to the present invention is the process for manufacturing the flux for the Pb-free Sn alloy solder such as Sn—Ag or Sn—Ag—Bi based solder, which the flux comprises the rosin-based base material containing abietic acid as the main component and the fine powder of the inorganic component having the action of enhancing the flux activity, wherein at least comprising a step for preparing the denatured rosin by hydrodesulfurization treatment of the crudely purified rosin in the presence of the desulfurization catalyst and a step where using the denatured rosin prepared by said hydrodesulfurization treatment as the rosin-based base material and in this rosin-based base material, the fine powder of the inorganic component having the action of enhancing the flux activity is added and dispersed as the state and by using the fine powder of said inorganic component as the desulfurization catalyst used for the hydrodesulfurization treatment, these two steps are simultaneously carried out.

As described above, the desulfurization catalyst used for the hydrodesulfurization treatment is exemplified by the cobalt-molybdenum catalysts (Co—Mo catalyst) supported on alumina. As the carrier used in the Co—Mo catalyst, the carrier, in which other metal oxide such as dichromium trioxide ($Cr_2O_3$) and nickel oxide (NiO) are added to alumina ($Al_2O_3$,) can be used. Alumina ($Al_2O_3$) itself is the solid acid working as a weak Lewis acid. When $Al_2O_3$—NiO and $Al_2O_3$—$Cr_2O_3$ are prepared by using this $Al_2O_3$ carrier, they themselves as alumina catalyst and chromic oxide catalyst become the fine powders of the solid acid having the catalytic function in hydrogenating reaction.

Such solid acids as $Al_2O_3$—NiO and $Al_2O_3$—$Cr_2O_3$ function slightly as the solid acid at a room temperature. However, at the high temperature, their functions as the solid acid become prominent. Therefore, when such solid acids as $Al_2O_3$—NiO and $Al_2O_3$—$Cr_2O_3$ are dispersed in the flux, at temperature as high as the flex temperature of the Sn—Ag solder, the work as the solid acid is expressed and thus, it can be used as the inorganic component enhancing the flux activity. In addition, this kind of the metal oxides having the function of the solid acid contains, needless to say, no halogen element such as chlorine, bromine, and the like and thus produces no halide ion, which is preferable.

Consequently, as the carrier supporting the catalytic metal for the desulfurization catalyst such as the Co—Mo catalyst, when the fine powder of such solid acids as $Al_2O_3$—NiO and $Al_2O_3$—$Cr_2O_3$ is used, the powder of the desulfurization catalyst to be mixed in the hydrodesulfurization treatment as described above as it is can be more preferably used as the inorganic component enhancing the flux activity. Furthermore, as the carrier supporting the metal catalyst, the solid acid, in which strength of the acid center (acid active center) on the surface thereof is enhanced by the hydrogen reduction as described above, or the solid acid, in which the acid center (acid active center) is expressed, is more preferable.

In using the fine powder of such solid acids as $Al_2O_3$—NiO and $Al_2O_3$—$Cr_2O_3$, as the carrier supporting the catalytic metal, in the case where the fine powder of said carrier is also used as the inorganic component enhancing the flux activity finally, in order to keep enough the function of the solid acid, the catalytic metal such as the Co—Mo catalyst is more preferably adapted to present thinly on the fine powder of said solid acids.

The desulfurization catalyst such as the Co—Mo catalyst is solid even though it is powder, and therefore, after the hydrodesulfurization treatment is carried out, the method for routine means of solid-liquid separation such as methods of heating filtration, separation by distillation is used to allow separating and collecting the denatured rosin yielded. Further addition of the inorganic component enhancing the predetermined flux activity to disperse in this separated and purified denatured rosin allows preparation of the soldering flux according to the present invention. However, in such case of the manufacturing process according to the present invention, a large improvement of workability can be realized by selecting the fine powder as is the fine powder of the inorganic component having the action of enhancing the flux activity and working as the desulfurization catalyst used for the hydrodesulfurization treatment.

After the hydrodesulfurization treatment is carried out, the denatured rosin becomes the solid by decreasing the liquid temperature to a room temperature and is separated from the diluting solvent such as alcohol added with the purpose of increasing fluidity in reaction. A bubble of the hydrogen gas or the diluting solvent in slight amount remains sealed inside the denatured rosin separated and purified. The bubble of the hydrogen gas or a bubble of the diluting solvent can be removed by heating again the denatured rosin to liquefy for degassing or evaporation. After operation of this final process, it is solidified again and sealed in a proper container to store.

For example, for the process for manufacturing the flux for the Pb-free solder, such as Sn—Ag or Sn—Ag—Bi based solder, according to the present invention, it is more preferable to be carried out in the form for preparation of the soldering flux according to the steps described below.

(Pretreatment)

Step 1: removing the solid contaminant impurities from the crudely purified rosin yielded from pitch.

Step 2: fluidizing the crudely purified rosin by dilution using the dilution solvent (such as an alcohol).

In this step, the impurities soluble in the dilution solvent are separated.

(Desulfurizing Treatment and VOC Molecule-Removing Treatment)

Step 3: adding the fine particle of the Co—Mo catalyst (desulfurization catalyst) used for hydrogenating desulfurization to mix and disperse in the crudely purified rosin fluidized.

Particularly, the fine particle of the solid acid is used as the carrier for said desulfurization catalyst.

Step 4: After mixing the fine particle of said desulfurization catalyst, filling the crudely purified rosin in a hydrogen reducing apparatus (reaction container).

Step 5: For example, under the condition of the reaction temperature of 250° C. and some atmospheric pressures of hydrogen, circulating the hydrogen gas in the reaction container to carry out hydrogenating reduction and desulfurization.

Step 6: removing impurities and a gaseous product, which are evaporated in the gas phase in said reaction, in particular the volatile organic compounds and $H_2S$.

Step 7: After a predetermined reaction time passes, cooling the temperature in the reaction container to the room temperature to collect the denatured rosin.

(Additional Post-Treatment)

Step 8: removing hydrogen gas used for the reaction as described above.

When required, removal of unnecessary dilution solvent unnecessary is also carried out.

Step 9: putting the soldering flux completed in treatment and adjustment in a desired container to seal it hermetically.

Through a series of steps as described above, at the point where the step 7 is completed, desulfurization and the treatment of removal of the volatile organic compound impurities are essentially completed. On the other hand, the fine powder itself of the solid acids, for example, the fine powder of the solid acids such as $Al_2O_3$—NiO and $Al_2O_3$—$Cr_2O_3$, used for the carrier of the desulfurization catalyst, which is mixed and dispersed as the fine particle of the desulfurization catalyst, becomes the inorganic component enhancing the flux activity, and thus the soldering flux has been obtained already in this state. Thereafter, normally, as the additional post-step such as removal of the hydrogen gas used in the reaction, the step 8 and the step 9 described thereafter are set.

Figure 4:
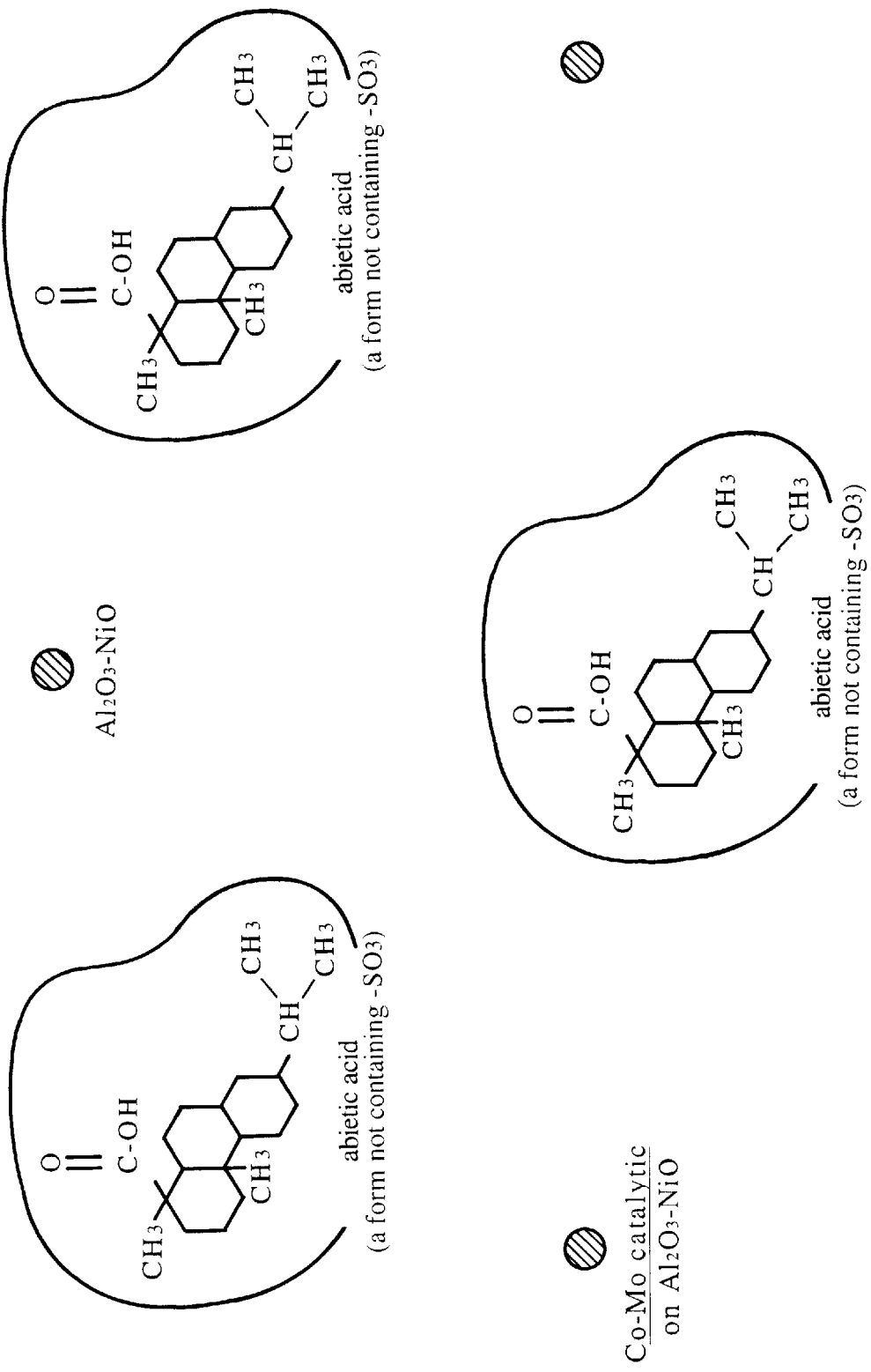
FIG. 4 shows an example of the rosin-based flux according to the present invention, and is a schematic figure illustrating the constitution of a rosin-based base material and an inorganic component enhancing the flux activity and the state of existence thereof.

In other words, when the hydrodesulfurization treatment is carried out by using the fine powder of the solid acid having multiple functions as described above, in the denatured rosin yielded, as shown diagrammatically in FIG. 4, sulfur existing as sulfonyl on the abietic acid molecule is removed to leave abietic acid free from the sulfur component. In addition, during this process, it becomes one in which the fine powder of the solid acid having the complicated function is dispersed. In this stage, this denatured rosin, in which the fine powder of the solid acid having such multiple functions is dispersed, becomes the rosin-based flux as it is. In addition, in the hydrogenating desulfurization as described above, the fine powder of the solid acid having the multiple functions is of course put in the hydrogenating reduction environment to achieve its activation, enhancement of the acid strength, or processing of expressing the acid center.

As described above, in the flux for the Pb-free solder, such as Sn—Ag or Sn—Ag—Bi based solder, according to the first invention of the present invention, the essence of the invention is in the point that it does not use the inorganic component containing such halogen elements as chlorine or bromine, which is added to the rosin-based flux for the conventional Sn—Pb alloy solder as component for enhancing the flux activity, in other words, one having a role to increase the acid strength of the flux at the soldering temperature. In addition, the denatured rosin, from which the sulfur component derived from the crudely purified rosin as a raw material is removed, is used for the rosin-based flux, for which the conventional crudely purified rosin has been used, and thus the inorganic component containing such halogen elements as chlorine or bromine is not used, which insures the advantage capable of avoiding deterioration of material or defect in durability of the Pb-free solder, such as Sn—Ag or Sn—Ag—Bi based solder.

Removal of the sulfur component contained as the impurity as described above must be carried out only when required in accordance with the crudely purified rosin as the raw material, while it is preferable to carry out of course; however, it is not necessarily the essence of the invention. Consequently, in the first invention of the present invention, it is an optionally selected additional element.

For example, if it is assumed that a large part of the sulfur component derived from the crudely purified rosin as the raw material exists as free $SO_4^{2-}$ and $SO_3H$ or a part exists in abietic acid molecule as sulfonyl. In addition, it is assumed that in soldering work, when a reductive atmosphere is not strong enough to reduce the sulfur component in its oxidized state to the sulfide ion, reduction occurs only to result in failure of generating the sulfide ion, an effect of preceding removal of the sulfur component derived from the crudely purified rosin as the raw material does not appear remarkably. Therefore, in accordance with the atmosphere of the soldering work and an existing condition of the sulfur component derived from the crudely purified rosin as the raw material, there may be a case requiring no removal of the sulfur component contained as impurities.

The soldering flux according to the second invention of the present invention has optimal properties to the soldering flux, as described above, which has a less amount of the VOC molecules, no sulfur impurities, and at the soldering temperature, a high acidity in a degree enough to the flux activity, on the other hand, at the room temperature, a low acidity in the degree of almost no difference from rosin used.

EXAMPLES

The flux for the Pb-free solder, such as Sn—Ag or Sn—Ag—Bi based solder, according to the present invention and the process for preparation thereof will be specifically described below with reference to examples. Examples cited here by are types of the best modes in embodiments according to the present invention. However, the scope of present invention is not restricted within those of these examples.

Example 1

On the basis of the result of study as described above, as a flux for the Pb-free solder, such as Sn—Ag or Sn—Ag—Bi based solder, the rosin-based flux with the constitution as described below was prepared. Specifically, a denatured rosin subjected to the hydrodesulfurization treatment is used as the rosin-based base material and as the catalyst for this hydrodesulfurization treatment, by using the fine powder of the solid acid such as $Al_2O_3$—NiO and $Al_2O_3$—$Cr_2O_3$ as the carrier, the fine particle of Co—Mo catalyst-solid acid and carrier ($Al_2O_3$—$Cr_2O_3$,) which was prepared by layering thinly the Co—Mo catalyst on the carrier, was used. Further, after the hydrodesulfurization treatment, the fine particle of Co—Mo catalyst-solid acid and carrier ($Al_2O_3$—$Cr_2O_3$) dispersed in the denatured rosin was used as it is as the inorganic component to add for enhancing the flux activity. For reference, this denatured rosin becomes that from which the sulfur components was removed during the hydrodesulfurization treatment as described above and also the VOC molecule, which left as the impurity in the crudely purified rosin as the raw material, was removed.

The rosin-based flux with the constitution as described above was prepared by a series of processes comprising the step 1 to the step 9 described above. Specific processes and conditions of each step will be described below.

(Pretreatment)

Step 1:

The polluting solid impurities were removed from the crudely purified rosin as the raw material.

Step 2:

The crudely purified rosin, from which the solid impurities had been removed, was diluted by using the diluting solvent to fluidize it. In this example, as the diluting solvent, the solvent, isopropyl alcohol, which is used for cleaning to remove the flux left after soldering, was used. Isopropyl alcohol can, needless to say, dissolve rosin and is widely used as the organic solvent for cleaning in the manufacturing steps of a semiconductor apparatus. In addition, it is one of those among alcohol solvent showing the lowest effect to human health.

Using 50 ml (about 40 g) of isopropyl alcohol for 100 g of the crudely purified rosin, at a temperature of 40° C., powder of the crudely purified rosin was dispersed and stirred in the diluting solvent to fluidize it.

(Desulfurizing Treatment and VOC Molecule-Removing Treatment)

Step 3:

As the catalysts used for the hydrodesulfurization treatment, the fine particle of the Co—Mo catalyst (desulfurization catalyst) was used. Specifically, the fine particle of the solid acid ($Al_2O_3$—$Cr_2O_3$) was used as the carrier and for 100 weight parts of this fine particle of the solid acid ($Al_2O_3$—$Cr_2O_3$), 0.5 weight parts of the Co—Mo metal catalyst in total was supported to prepare the fine particle of the Co—Mo catalyst-solid acid and carrier ($Al_2O_3$—$Cr_2O_3$) for use. The fine particle of solid acid ($Al_2O_3$—$Cr_2O_3$) used was that of which average particle size was 5 $\mu$m and an average composition was a ratio of $Al_2O_3:Cr_2O_3=1:1$. For reference, the method for supporting the Co—Mo metal catalyst used was the method for supporting it on the alumina carrier, employed by the conventional Co—Mo catalyst.

In the present example, 1.0 g of the above described fine particle of the Co—Mo catalyst-solid acid and carrier was used for 100 g of the crudely purified rosin. The crudely purified rosin, in which the hydrodesulfurization catalyst was evenly dispersed, was filled in the pressurized reaction container.

Step 4 to step 6:

The reaction condition of desulfurizing treatment using the hydrodesulfurization catalyst was selected as 250° C. of the reaction temperature, and 2.5 atmospheric pressures of hydrogen used for hydrogenating reduction. After filling the crudely purified rosin, in which the hydrodesulfurization catalyst was evenly dispersed, hydrogen gas circulation was carried out in the pressurized reaction container (hydrogen reducing apparatus) under the condition as described above to carry out the heating reaction for about 30 minutes.

In this heating reaction. $H_2S$ and VOC molecule (methane and the like) generated, which were contained in the hydrogen gas circulated, were separated and removed by the conventional method.

Step 7:

After the reaction time as described above passes, heating was stopped and the temperature in the reaction container was cooled to the room temperature. In the present example, in the hydrodesulfurization catalyst itself, the fine particle of the solid acid used for the carrier was used as the inorganic component enhancing activity to be given to the flux. Therefore, at this stage, the objective flux, in which the fine powder of the solid acid has been uniformly dispersed in the denatured rosin, was obtained.

(Additional Post-Treatment)

Step 8 and step 9:

Substantially, flux preparation has been completed. However, removal of the hydrogen gas used for the reaction as described above was carried out. Thereafter, when required, removal of the unnecessary dilution solvent can be carried out. The soldering flux, which was already subjected to treatment and preparation, was put in the predetermined container to seal it.

Example 2

It was evaluated that the soldering flux according to the present invention has the desired flux activity to the Pb-free solder, such as Sn—Ag or Sn—Ag—Bi based solder. In addition, it was evaluated that using the soldering flux according to the present invention suppresses occurrence of deterioration of material or defect in durability.

Specifically, the soldering flux prepared in the example 1 as described above was applied to soldering by using Sn—Ag—Cu—Bi based solder which is typical one of the Pb-free solder. The flex temperature of this Sn—Ag—Cu—Bi based solder was 210° C. and higher than the flex temperature 183° C. of the conventional Sn—Pb solder, and it was conventionally difficult to remove a surface oxide of copper in soldering thereof. By using the soldering flux described in the example 1, some hundred of chip resistors were soldered on an electronic circuit multi-layered substrate (PWB) to evaluate soldering characteristics thereof. Use of the soldering flux described in the example 1 provides good spreading of the melted solder on the surface of a copper wiring pattern and formation of a filet similar to that of by use of the conventional Sn—Pb solder. In other words, in comparison with soldering by the Sn—Pb solder using the conventional rosin-based flux, comparable good soldering was carried out.

After soldering, a heat cycle-accelerated duration test was conducted at the heat cycle between 120° C. and −40° C. to evaluate presence or absence of occurrence of a defect in a soldered part. In the range corresponding to 10 years of a concerted use time, no observation was made for corrosion and the like on the surface of the solder in the soldered part. No finding was made on a sign of peeling and crack of the soldered part. However, after completion of heat cycle-accelerated duration test as described above, a detailed inspection of the inside of a solder material revealed a slight micro crack characteristic of this Sn—Ag—Cu—Bi based solder.

SUMMARY OF DISCLOSURE

The soldering flux according to the present invention is that in which applying an advantage, namely an air-insulating function of an organic compound having a high boiling point and a function as a carboxylic acid used for dissolution and removal of an oxidized film on a metal surface and a solvent for a metal carboxylic acid salt produced thereby, of using rosin as the base material contained in the conventional rosin-based flux, it was adapted to be suitable for so-called Pb-free solder, such as Sn—Ag or Sn—Ag—Si based solder. First of all, as an inorganic component enhancing the activity of the flux that is dispersed in the flux, a compound of which constituent element contains no halide ion is used. Therefore, for silver contained in the Pb-free solder such as Sn—Ag or Sn—Ag—Bi based solder, production of chloride and bromide of silver can be prevented. On the other hand, preferably, for the rosin-based base material used, using the denatured rosin subjected to the hydrodesulfurization treatment to remove sulfur contained in the crudely purified rosin allows preventing production of sulfide of silver. In addition, as a measure against an increase in the soldering temperature, preceding removal of a volatile organic compound allows preventing pollution of working environment.

What we claim is:

1. A flux for Pb-free Sn-based alloy solder composed of a rosin-based base material containing abietic acid a main component, wherein said rosin-based base material is a denatured rosin made by hydrodesulfurization treatment of a crudely purified rosin in the presence of a desulfurization catalyst.

2. A flux for Pb-free Sn-based alloy solder composed of a rosin-based base material containing abietic acid as a main component, wherein the flux contains fine powder of an inorganic component having an action of enhancing a flux activity that is added to and dispersed in the rosin-based base material, and the flux is free from any compound of which a constitutional element is a halide ion, and said fine powder of an inorganic component is fine powder of a solid acid.

3. The soldering flux according to claim 2, characterized in that said fine powder of solid acid is of solid acid for which an acid strength has been enhanced or an acid point has been expressed by hydrogen reduction.

4. The soldering flux according to claim 2, characterized in that said fine powder of solid acid is fine powder of a complex that comprises a fine powder carrier consisting of an inorganic compound and an inorganic compound other than the inorganic compound used for the fine powder carrier, which is supported on the carrier, and the fine powder of said complex, as a whole, exhibits an action as the solid acid.

5. The soldering flux according to claim 4, characterized in that said fine powder of a complex is fine powder of $Al_2O_3$—NiO or/and $Al_2O_3$—$Cr_2O_3$ in which NiO or $Cr_2O_3$ is supported on a fine powder $Al_2O_3$ as a carrier.

6. A flux for Pb-free Sn-based alloy solder composed of a rosin-based base material containing abietic acid as a main component, wherein the flux contains fine powder of an inorganic component having an action of enhancing a flux activity that is added to and dispersed in the rosin-based base material, and the flux is free from any compound of which a constitutional element is a halide ion, and said rosin-based base material is denatured rosin that is prepared by hydrodesulfurization treatment of crudely purified rosin in the presence of a desulfurization catalyst.

7. The soldering flux according to claim 1, characterized in that said denatured rosin is denatured rosin that is prepared by hydrodesulfurization treatment and also a treatment for removal by evaporation of an evaporative organic compound impurity included in the impurity derived from the crudely purified rosin.

8. A process for preparing a flux for Pb-free Sn-based alloy solder, which contains a rosin-based base material containing abietic acid as a main component and a fine powder of an inorganic component having an action of enhancing a flux activity, characterized in that at least comprising a step for preparing denatured rosin by hydrodesulfurization treatment of crudely purified rosin in the presence of a desulfurization catalyst, wherein said desulfurization catalyst used is a desulfurization catalyst working also as fine powder of an inorganic component having an action of enhancing a flux activity, which is, after said step for hydrodesulfurization treatment, used as the fine powder of the inorganic component having an action of enhancing a flux activity as it is.

9. The soldering flux according to claim 3, characterized in that said fine powder of solid acid is fine powder of a complex that comprises a fine powder carrier consisting of an inorganic compound and an inorganic compound other than the inorganic compound used for the fine powder carrier, which is supported on the carrier, and the fine powder of said complex, as a whole, exhibits an action as the solid acid.

10. The soldering flux according to claim 2, characterized in that said rosin-based material is denatured rosin that is prepared by hydrodesulfurization treatment of crudely purified rosin in the presence of a desulfurization catalyst.

11. The soldering flux according to claim 3, characterized in that said rosin-based material is denatured rosin that is prepared by hydrodesulfurization treatment of crudely purified rosin in the presence of a desulfurization catalyst.

12. The soldering flux according to claim 4, characterized in that said rosin-based material is denatured rosin that is prepared by hydrodesulfurization treatment of crudely purified rosin in the presence of a desulfurization catalyst.

13. The soldering flux according to claim 5, characterized in that said rosin-based material is denatured rosin that is prepared by hydrodesulfurization treatment of crudely purified rosin in the presence of a desulfurization catalyst.

14. The soldering flux according to claim 6, characterized in that said denatured rosin is denatured rosin that is prepared by hydrodesulfurization treatment and also a treatment for removal by evaporation of an evaporative organic compound impurity included in the impurity derived from the crudely purified rosin.

15. A flux for Pb-free Sn-based alloy solder, composed of a rosin-derived base material comprising:

a main component composed of abietic acid having flux activity;

fine powder of an inorganic component capable of enhancing flux activity by the abietic acid, said fine powder being dispersed through the main component; and no compound containing a halide ion.

16. The flux according to claim 15, wherein the fine powder is solid acid.

17. The flux according to claim 15, wherein the fine powder is contained in an amount of 0.1 to 4.0 parts by weight per 100 parts by weight of the rosin-derived base material.

18. The flux according to claim 15, wherein the fine powder has a particle size of 0.01–1 $\mu$m.

19. The flux according to claim 15, wherein the rosin-derived base material is denatured rosin by hydrodesulfurization, and the fine powder has been used as a carrier of a desulfurization catalyst used for hydrodesulfurization.

20. A method of producing a flux for Pb-free Sn-based alloy solder, said flux being composed of a denatured rosin, comprising subjecting crudely purified rosin to hydrodesulfurization in the presence of a desulfurization catalyst to obtain a denatured rosin, said catalyst being provided with a carrier composed of fine powder of an inorganic component capable of enhancing flux activity.

\* \* \* \* \*

UNITED STATES PATENT AND TRADEMARK OFFICE
CERTIFICATE OF CORRECTION

PATENT NO. : 6,630,036 B2  Page 1 of 1
DATED : October 7, 2003
INVENTOR(S) : Keiko Suita et al.

It is certified that error appears in the above-identified patent and that said Letters Patent is hereby corrected as shown below:

Title page,
Item [73], Assignee, delete "Advatest Corporation" and insert -- Advantest Corporation --.

Signed and Sealed this

Twenty-fourth Day of August, 2004

JON W. DUDAS
*Director of the United States Patent and Trademark Office*